United States Patent Office 3,526,476
Patented Sept. 1, 1970

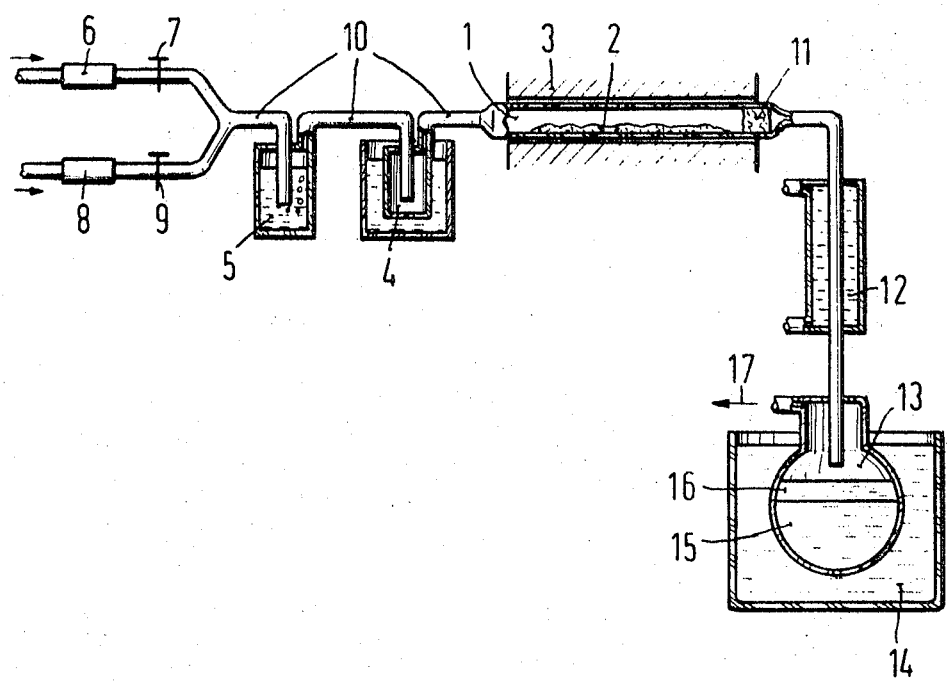

3,526,476
METHOD OF PRODUCING HIGHLY PURE ARSENIC TRICHLORIDE
Erhard Sirtl, Munich, Germany, assignor to Siemens Aktiengesellschaft, Berlin and Munich, Germany, a corporation of Germany
Filed Feb. 19, 1968, Ser. No. 706,264
Claims priority, application Germany, Feb. 28, 1967, S 108,556
Int. Cl. C01b 27/00
U.S. Cl. 23—98      4 Claims

ABSTRACT OF THE DISCLOSURE

Described is a process for producing highly purified arsenic trichloride, with a sulphur content smaller than 0.1 p.p.m. The process is characterized by passing highly pure, gaseous hydrogen chloride in the presence of elemental oxygen, across arsenic trioxide, heated in a reaction chamber. The gaseous arsenic trichloride, formed thereby, and the aqueous hydrochloric acid which contains the sulphur oxides as a distillate are received in a vessel, cooled below room temperature, so that a two-phase condensate, comprised of a solution of arsenic trichloride and aqueous hydrochloric acid, containing the sulphur oxides, forms in said receiving vessel and separating the two layers.

---

My present invention relates to a method of producing highly pure arsenic trichloride, particularly for semiconductor purposes, having a sulphur content of less than 0.1 p.p.m.

For highest frequency uses in the field of $A^{III}B^{V}$ semiconductor components, it is required that the thin gallium arsenide layers, precipitated by epitactic means be of the highest possible purity. Therefore, in the production of gallium arsenide for example, the original material, gallium and arsenic trichloride, should be of the highest possible purity. The purity of epitactic gallium arsenide layers produced from gallium, arsenic trichloride and hydrogen depends, to a large degree, upon the purity of the arsenic trichloride used in production.

In the known methods, pure arsenic trichloride is primarily produced by chlorinating elemental, prepurified arsenic or by reacting arsenic trioxide with hydrogen chloride. Neither method ensures that the metallic impurities, nor the sulphur, which is a natural content of arsenic containing minerals, or its components will be removed. Since sulphur is substitutionally installed into the gallium arsenide lattice, at arsenic sites and constitutes a donor of low activating energy while showing, in compound form, a very similar behavior to the main substance ($As_2O_3/As_2S_3$; $AsCl_3/S_2Cl_2$). It is absolutely necessary that the amount of sulphur and its compounds be kept as low aspossible when producing arsenic or arsenic trichloride for semiconductor purposes.

My present invention has as an object a method for producing highly pure arsenic trichloride having a sulphur content of less than 0.1 p.p.m. To this end, and in accordance with this invention, highly pure gaseous hydrogen chloride is passed, in the presence of elemental oxygen, across arsenic trioxide, heated in a reaction chamber. The gaseous arsenic trichloride, formed thereby, and the aqueous hydrochloric acid, containing the sulphuric oxide as a distillate are received by a vessel cooled below room temperature, to form a two-phase condensate, comprised of an arsenic trichloride solution and aqueous sulphuric oxides containing hydrochloric acid. It is thus within the framework of the present invention to reflux the arsenic trichloride condensate, separated from the hydrochloric acid solution, with a nitrogen flow to remove possibly remaining sulphur compounds, in the presence of a bottom body, comprised of a moisture laden surface active and acid resistant material, subsequently subjecting the arsenic trichloride solution to fractional distillation.

A further development of my inventive idea is to adjust the share of elemental oxygen in the hydrogen chloride gas at 3 to 10%. The temperature in the reaction chamber is between 180 and 250° C. and is preferably about 200° C.

To effect additional purification of the reaction gases, prior to their entry into the reaction chamber, the gaseous hydrogen chloride, and the elemental oxygen, are first passed through a 50% perchloric acid solution and subsequently through a cooling trap, preferably maintained at a temperature of $-78°$ C. The cooling trap which is connected directly in front of the reaction chamber is fed with a Dry Ice mixture ($CO_2$). This is particularly well suited as the sublimation point of hydrogen chloride is $-81°$ C.

The collecting vessel for the formation of the two-phase condensate which is comprised of the aqueous arsenic trichloride solution and the sulphuric oxides containing hydrochloric acid solution, is cooled by means of a temperature bath, preferably to 0° C.

One advantage of my method as compared to known methods, is in the fact that the sulphur, or its components, contained in the arsenic trioxide is converted, by means of the elemental oxygen, primarily into sulphuric dioxide ($SO_2$) and is not precipitated in form of sulphur monochloride ($S_2Cl_2$) which is the case in conventional chlorating processes and which is hard to distill from the arsenic trichloride. The sulphur dioxide leaves the condensate either as a gas or is preferably found in the aqueous layer of the two-phase condensate ($AsCl_3$/aqueous HCl). Since it is harder to dissolve the arsenic chloride in water, which is precipitated as a reaction product, then the hydrogen chloride which contains the sulphur dioxide, and as it has a higher specific weight than the aqueous hydrochloric acid, the separation of the arsenic trichloride is very easily carried out.

The arsenic trichloride, obtained in this manner, has already obtained a high degree of purity. For further purification of any possibly still present small amounts of sulphur monochloride ($S_2Cl_2$), the arsenic trichloride solution of the present invention is boiled under reflux at least for one hour, in a nitrogen flow. If necessary, a moisture laden, surface active, acid resistant bottom body, in the form of an inorganic oxide hydrate, e.g. aluminum oxide powder, silicagel or titanium dioxide, for a preferred hydrolysis of the remaining sulphur chloride, is used according to the equation.

$$S_2Cl_2 + 2H_2O = H_2S + SO_2 + 2HCl$$

The bottom body is subsequently separated therefrom. In each instance, the raw product is subjected to a fractional distillation in a multiple effect separation column. For this purpose, a column with at least 20 theoretical distillation bottoms was found to be very favorable.

An additional advantage of my invention is that many impurities in an oxidizing atmosphere are easily maintained as oxides in the reaction residue, for example silicon as silicon dioxide, and titanium as titanium dioxide. The arsenic oxide, incidentally, may be advantageously reacted in a whirling layer, with the reaction gas.

More details regarding the execution of my invention may be derived from the single figure.

A reaction chamber 1, comprising a quartz tube, holds $As_2O_3$ powder 2, which is provided for chlorination. The quartz tube is completely surrounded by an adjustable furnace 3, which can heat the reaction chamber to a temperature of approximately 200° C. A cooling trap 4, connected upstream of the reaction chamber 1, is kept to a temperature of −78° C., by a mixture of Dry Ice. To remove the impurities, contained in the reaction gases, a vessel 5 containing a 50% perchloric acid solution is arranged upstream of the cooling trap 4. The reaction gas is formed by the elemental oxygen, flowing into the supply line 10, via the flowmeter 6 and the open valve 7 and by the hydrogen chloride gas, flowing into the supply line 10, via the flowmeter 8 and the open valve 9, by adjusting a mixture of, for example, 10% elemental oxygen and 90% hydrogen chloride gas which, after passing through the perchloric acid solution 5, as well as through the cooling trap 4, enters the reaction chamber 1, heated to 200° C., where it reacts with the $As_2O_3$ present therein. The gaseous $AsCl_3$ leaves the reaction chamber 1, sealed at the end with a quartz wool stopper 11, serving as a dust filter; together with the sulphuric oxides, freed from the $As_2O_3$ by the elemental oxygen and the excess HCl gas and reaches, via a condenser 12 cooled by cold water, a receiver 13, which is maintained at 0° C., by a temperature bath 14. After the start of reaction, the receiving vessel contains a two-phase condensate, consisting of aqueous $AsCl_3$ solution 15 and aqueous HCl solution 16, arranged above the latter. The HCl solution contains substantially all of the dissolved sulphur compounds stemming from the $As_2O_3$. The remaining gases leave the apparatus at the arrow marked 17.

The $AsCl_3$ solution thus obtained is separated from the aqueous HCl solution by a separating funnel and brought to a boiling under reflux means of a surface active, moisture-laden $Al_2O_3$ powder of appropriate purity to remove $S_2Cl_2$ and to eliminate any remaining $SO_2$, in a nitrogen current. It is subsequently subjected to fractional distillation in a column, whose separating effect corresponds to at least 20 theoretical bottoms. Care must be taken that at least 20% of the total charge is separated in a first run, since the arsenic trichloride phase still contains compounds with OH groups (hydroxy chlorides) which dissociate with initial distillation with the splitting off of water.

If necessary, the thus obtained arsenic trichloride $AsCl_3$ may be very easily converted into elemental arsenic, by means of known reduction methods.

Due to its high purity, the arsenic trichloride, produced in accordance with the present invention, is particularly well suited for the production of gallium arsenide, especially for producing thin, epitactic layers, which are needed for semiconductor components with highest frequency requirements as for example Gunn-diodes. Also, the arsenic trichloride or arsenic, produced in accordance with the present invention, has shown very good results as the original material for other compound semiconductors.

I claim:

1. A method for producing highly pure arsenic trichloride, whereby a mixture of highly pure, gaseous hydrogen chloride containing 3 to 10% elemental oxygen is pre-purified by passage through a 50% perchloric acid solution and then passed across an arsenic trioxide, with a sulphur impurity, which is heated in a reaction chamber and the thus formed gaseous arsenic trichloride and the developed aqueous hydrochloric acid and sulphur oxides are caught in form of a distillate in a vessel cooled to 0° C., to form a two-phase condensate in the receiving vessel, said condensate being comprised of arsenic trichloride solution and sulphur oxide-containing aqueous hydrochloric acid, the separated arsenic trichloride condensate is refluxed in a nitrogen current and in the presence of a bottom body, comprised of a moisture laden, surface active and acid resistant material and then subjected to a fractional distillation.

2. A method for producing highly pure arsenic trichloride, whereby a mixture of highly pure, gaseous hydrogen chloride containing 3 to 10% elemental oxygen is passed across an arsenic trioxide, with a sulphur impurity, which is heated in a reaction chamber and the thus formed gaseous arsenic trichloride and the developed aqueous hydrochloric acid and sulphur oxides are caught in form of a distillate in a vessel cooled to 0° C., to form a two-phase condensate in the receiving vessel, said condensate being comprised of arsenic trichloride solution and sulphur oxide-containing aqueous hydrochloric acid, and the separated trichloride condensate is refluxed in a nitrogen current and in the presence of a bottom body selected from the oxide hydrates of aluminum, silicon and titanium.

3. A method for producing highly pure arsenic trichloride, whereby a mixture of highly pure, gaseous hydrogen chloride, containing 3 to 10% elemental oxygen, is passed across an arsenic trioxide, with a sulphur impurity, which is heated in a reaction chamber and the thus formed gaseous arsenic trichloride and the developed aqueous hydrochloric acid and sulphur oxides are caught in form of a distillate in a vessel cooled to 0° C., to form a two-phase condensate in the receiving vessel, said condensate being comprised of arsenic trichloride solution and sulphur oxide-containing aqueous hydrochloric acid, and the separated arsenic trichloride condensate is refluxed in a nitrogen current and in the presence of a bottom body, comprised of a moisture laden, surface active and acid resistant material and then subjected to a fractional distillation.

4. A method of producing highly pure arsenic trichloride and which has a sulphur content of less than 0.1 p.p.m. comprising the steps of:
 (a) passing a highly pure gaseous hydrogen chloride gas containing a 3%–10% by volume of elemental oxygen over and across a layer of arsenic trioxide powder containing a sulphur impurity, said powder being externally heated in a reaction chamber to a temperature between 180°–250° C. to form gaseous arsenic trichloride, aqueous hydrochloric acid and sulphur oxides, said mixture being received in the form of a distillate in a vessel cooled to 0° C.,
 (b) allowing the reaction products to form a two-phase condensate in the receiving vessel, said condensate being comprised of a lower layer of aqueous arsenic trichloride solution substantially free of sulphur compounds and an upper layer of sulphur oxide-containing hydrochloric acid,
 (c) separating the arsenic trichloride solution from the aqueous hydrochloric acid solution,
 (d) fractionally distilling the said arsenic trichloride solution under reflux conditions with a nitrogen flow and in the presence of a bottom body, comprised of a moisture-laden, surface active and acid resistant material, thereby substantially removing any remaining sulphur compounds present in the formed arsenic trichloride solution.

References Cited

UNITED STATES PATENTS

| | | | |
|---|---|---|---|
| 1,512,734 | 10/1924 | Wescott | 23—98 |
| 1,525,480 | 2/1925 | Wescott | 23—98 XR |
| 1,852,183 | 4/1932 | Miller et al. | 23—98 |
| 1,936,078 | 11/1933 | Adamson | 23—98 XR |
| 2,383,105 | 8/1945 | Booth | 23—98 |
| 2,860,047 | 11/1958 | Reynaud et al. | 23—98 XR |
| 2,970,887 | 2/1961 | Hill | 23—98 XR |
| 3,194,631 | 7/1965 | Cobel et al. | 23—98 |
| 3,359,071 | 12/1967 | Merkel et al. | 23—98 XR |

EDWARD STERN, Primary Examiner

U.S. Cl. X.R.

23—209